United States Patent
Augustsson et al.

(10) Patent No.: US 11,976,818 B2
(45) Date of Patent: May 7, 2024

(54) SYSTEM AND METHOD FOR PROCESSING AN EXHAUST GAS

(71) Applicant: ANDRITZ Aktiebolag, Örnsköldsvik (SE)

(72) Inventors: Ola Bjoern Augustsson, Vaxjo (SE); Hao Sun, Beijing (CN)

(73) Assignee: GE Infrastructure Technology LLC, Greenville, SC (US)

( * ) Notice: Subject to any disclaimer, the term of this patent is extended or adjusted under 35 U.S.C. 154(b) by 558 days.

(21) Appl. No.: 17/251,260

(22) PCT Filed: May 29, 2019

(86) PCT No.: PCT/US2019/034342
§ 371 (c)(1),
(2) Date: Dec. 11, 2020

(87) PCT Pub. No.: WO2019/240948
PCT Pub. Date: Dec. 19, 2019

(65) Prior Publication Data
US 2021/0262659 A1    Aug. 26, 2021

(30) Foreign Application Priority Data

Jun. 12, 2018  (CN) .......................... 201810600206.6

(51) Int. Cl.
*F23G 7/06*        (2006.01)
*B01D 53/00*       (2006.01)
(Continued)

(52) U.S. Cl.
CPC ........... *F23G 7/068* (2013.01); *B01D 53/005* (2013.01); *B01D 53/343* (2013.01); *B01D 53/72* (2013.01);
(Continued)

(58) Field of Classification Search
CPC ..... F23G 7/068; B01D 53/005; B01D 53/343; B01D 53/72; B01D 2251/102; B01D 2257/708; B01D 2259/655
(Continued)

(56) References Cited

U.S. PATENT DOCUMENTS 5,240,403 A * 8/1993 McAnespie ............. F23G 7/068
                                                    451/92
5,297,954 A * 3/1994 Colagiovanni ......... F23G 7/068
                                                   110/211
(Continued)

FOREIGN PATENT DOCUMENTS

CN    101792139 A    8/2010
CN    104 033 912 A    9/2014
(Continued)

OTHER PUBLICATIONS

Chinese Office Action Corresponding to Application No. 201810600206 dated Jun. 8, 2023.
(Continued)

*Primary Examiner* — Justin M Jonaitis
(74) *Attorney, Agent, or Firm* — Dority & Manning, P.A.

(57) ABSTRACT

Various embodiments disclosed herein include a system and method for processing an exhaust gas. The system comprises a regenerative thermal oxidizer (RTO), a bypass flow module in parallel with the RTO, and a mixing module disposed downstream of the RTO; wherein the RTO is configured to oxidize a first part of the exhaust gas and produce a hot tail gas and deliver a predetermined amount of the hot tail gas outside of the RTO, and the mixing module is configured to receive the predetermined amount of the hot tail gas; and wherein the bypass flow module is configured to receive and bypass a second part of the exhaust gas around the RTO into the mixing module; and wherein the second part of the exhaust gas absorbs sufficient heat from the predetermined
(Continued)

amount of the hot tail gas in the mixing module for oxidizing and decomposing an organic compound therein.

19 Claims, 5 Drawing Sheets

(51) Int. Cl.
  *B01D 53/34* (2006.01)
  *B01D 53/72* (2006.01)
(52) U.S. Cl.
  CPC .. *B01D 2251/102* (2013.01); *B01D 2257/708* (2013.01); *B01D 2259/655* (2013.01)
(58) Field of Classification Search
  USPC .......................................................... 165/4
  See application file for complete search history.

(56) References Cited

U.S. PATENT DOCUMENTS

| | | | | |
|---|---|---|---|---|
| 10,487,283 | B1* | 11/2019 | Jamaluddin | ................ F23J 7/00 |
| 2006/0046217 | A1* | 3/2006 | Parker | ..................... F23G 5/006 |
| | | | | 431/5 |

FOREIGN PATENT DOCUMENTS

| | | | | |
|---|---|---|---|---|
| CN | 104033912 | A | * | 9/2014 |
| CN | 104 474 844 | A | | 4/2015 |
| CN | 106731280 | A | | 5/2017 |
| CN | 206469276 | U | | 9/2017 |
| CN | 206 626 584 | U | | 11/2017 |
| CN | 107366922 | A | | 11/2017 |
| CN | 207471555 | U | | 6/2018 |
| DE | 102006013403 | A1 | | 9/2007 |
| EP | 1350552 | A2 | | 10/2003 |
| GB | 367709 | A | | 2/1932 |
| JP | S56168825 | A | | 12/1981 |
| JP | H11325443 | A | | 11/1999 |
| JP | 2000171022 | A | | 6/2000 |
| JP | 2002115836 | A | | 4/2002 |
| JP | 2007127401 | A | | 5/2007 |
| KR | 20120082163 | A | | 7/2012 |
| KR | 101796242 | B1 | | 12/2017 |

OTHER PUBLICATIONS

Korean Office Action Corresponding to Application No. 1020207037633 on Jan. 24, 2024.

* cited by examiner

US 11,976,818 B2

SYSTEM AND METHOD FOR PROCESSING AN EXHAUST GAS

FIELD

This disclosure relates generally to processing an exhaust gas, and more particularly to a method and system for processing the exhaust gas.

BACKGROUND

A regenerative thermal oxidizer(RTO) is generally utilized to process an exhaust gas, especially an exhaust gas containing an organic compound (referred as to "an organic exhaust gas"), and oxidize organic compounds therein at a high temperature and generate corresponding carbon dioxide ($CO_2$) and $H_2O$, such that the organic exhaust gas is purified and heat may be recovered from heat energy released during oxidizing and decomposing the organic compounds. Volatile organic compounds (VOC or VOCs) is one of common organic components in the organic exhaust gas, and VOC mainly comprises alkanes, alcohols, arenes, alkenes, esters, aldehydes, ketones and other organic compounds. Emission of VOC may be resulted from petrochemical industry, manufacture of medicines, manufacture of equipment, and other related industrial production process, production consuming behaviors and a tail gas of vehicle and so on.

In one or more prior arts, all organic exhaust gas containing VOC to be processed is substantially directed into the RTO for oxidizing. For the organic exhaust gas containing high concentration VOC, the RTOs of the prior arts are designed and made large for providing a large volume accordingly, thus increasing the cost.

It is desirable to achieve an improved technology for processing the exhaust gas to solve the problems as described above.

SUMMARY

According to one aspect of the disclosure herein, a system for processing an exhaust gas comprises a regenerative thermal oxidizer (RTO), a bypass flow module in parallel with the RTO and a mixing module disposed downstream of the RTO. The RTO is configured to oxidize a first part of the exhaust gas and produce a hot tail gas and deliver a predetermined amount of the hot tail gas outside of the RTO. The mixing module is configured to receive the predetermined amount of the hot tail gas from the RTO. The bypass flow module is configured to receive and bypass a second part of the exhaust gas around the RTO into the mixing module. The second part of the exhaust gas absorbs sufficient heat from the predetermined amount of the hot tail gas in the mixing module for oxidizing and decomposing an organic compound therein.

According to another aspect of the disclosure herein, a method for processing an exhaust gas comprises: providing a regenerative thermal oxidizer (RTO); directing a first part of the exhaust gas into the RTO for oxidizing and producing a hot tail gas and delivering a predetermined amount of the hot tail gas outside of the RTO; and directing and bypassing a second part of the exhaust gas around the RTO for mixing with the predetermined amount of the hot tail gas downstream of the RTO, such that the second part of the exhaust gas absorbs sufficient heat from the predetermined amount of the hot tail gas for oxidizing and decomposing an organic compound therein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The disclosure herein may be best understood with reference to the following description taken in conjunction with the accompanying drawings in which.

DETAILED DESCRIPTION OF THE DISCLOSURE

Figure 1:
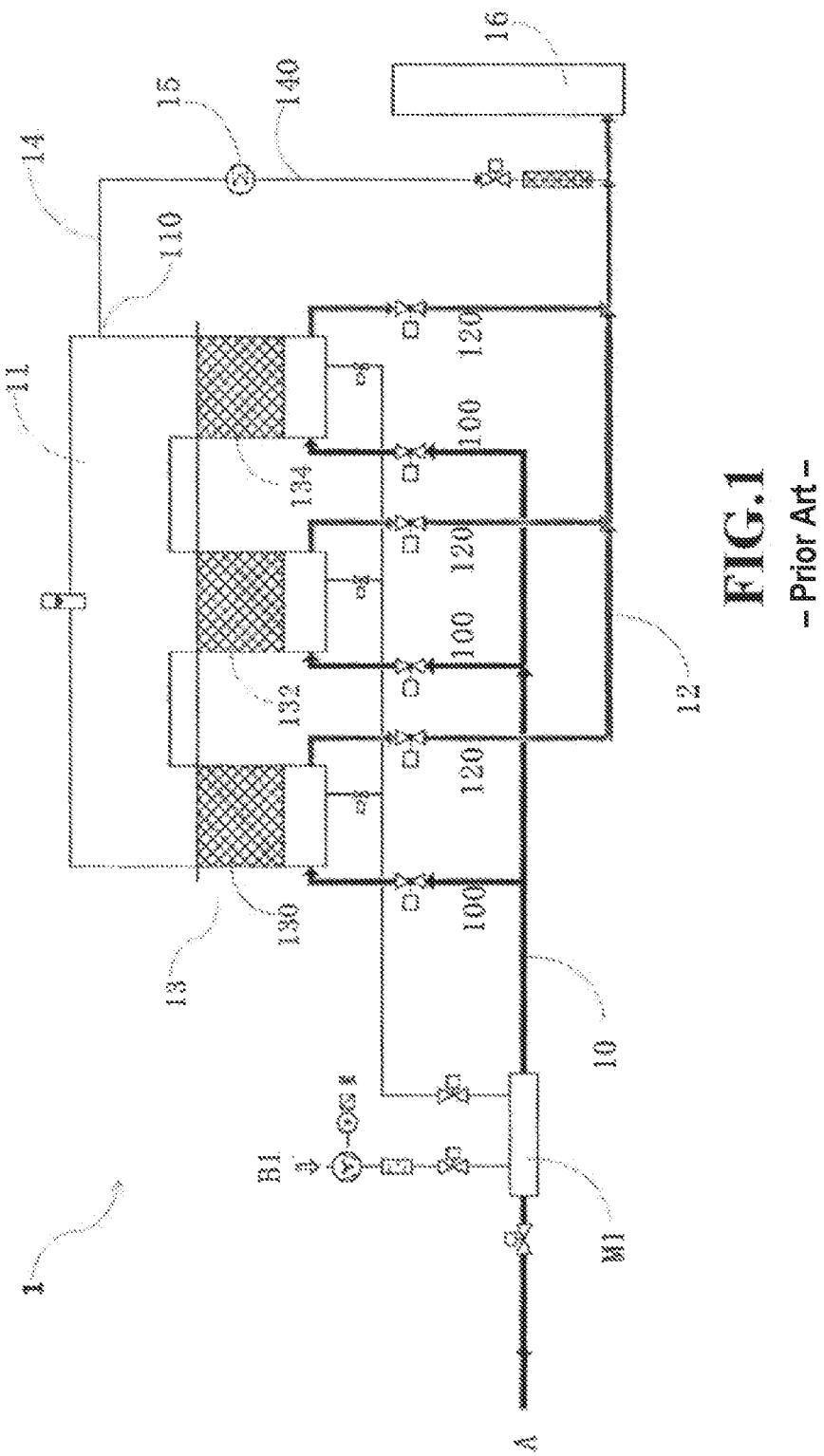
FIG. 1 is a schematic diagram of a prior art system for processing an exhaust gas.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "axial" or "axially" refers to the relative direction substantially parallel to the fluid flow. The modifier "about" used in connection with a quantity is inclusive of the stated value and has the meaning dictated by the context (e.g., includes the degree of error associated with measurement of the particular quantity).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be understood and noted that the terms "an/the organic exhaust gas" or "a/the first part of the organic exhaust gas" or "a/the second part of the organic exhaust gas" and so on, are intended to refer to "an/the exhaust gas containing an organic compound", more specifically to "a substantially in-organic gas (combustion gas) that also may contain a smaller portion (for example, 1 or 2 percent and so on, by volume or by weight) of organic compounds (such as VOC)", which may be also called as "an/the exhaust gas" or "a/the first part of the exhaust gas" or "a/the second part of the exhaust gas" and so on, respectively. The terms "an/the organic exhaust gas" and so on do not mean "the exhaust gas pertaining to an organic gas".

FIG. 1 shows a schematic diagram of a prior art system for processing an exhaust gas. As illustrated in FIG. 1, the system for processing the exhaust gas of the prior art comprises a RTO 1, and the RTO 1 generally comprises an inlet manifold 10, an oxidizing chamber or a combustion chamber 11, an outlet manifold 12, a plurality of regenerative heat-recovery chambers 13, an direct exhaust conduit 14, a heat recovery module or boiler a chimney 16, and a plurality of related control valves. In the prior art illustrated in FIG. 1, all organic exhaust gas A containing VOC to be processed is substantially directed into the oxidizing chamber 11 through the inlet manifold 10 for oxidizing. The direct exhaust conduit 14 is fluidly connected to a direct exhaust outlet 110 of the oxidizing chamber 11 for extracting a flow of the hot tail gas at a temperature ranging from 800° C. to 1000° C. as a superheat flow. Each of the heat-recovery chambers 13 comprises at least one heat storage/sink module (for example, at least one ceramic material bed) fluidly connected to the inlet manifold 10 and the outlet manifold 12 for exchanging heat with the hot tail gas or the all organic exhaust gas A flowing therethrough.

In order to decrease the VOC concentration or ensure the oxidizing chamber 11 to contain sufficient oxygen for oxidizing reaction, the all organic exhaust gas A is usually diluted at least one time before entering RTO. As illustrated in FIG. 1, the all organic exhaust gas A may be diluted by a first part of a diluting air B1 supplied by a first diluting air supply outside of the RTO 1, and a first mixer M1 may be disposed in the inlet manifold for mixing the all organic exhaust gas A and the first part of the diluting air B1 before they enter the RTO.

For the organic exhaust gas containing high concentration VOC, only one air dilution illustrated in FIG. 1 may result in too high temperature in the oxidizing chamber 11, such as exceeding about 1200° C., thereby producing toxic material that can't be discharged into ambient environment. For prevent the oxidizing chamber 11 from an over high temperature, such as exceeding about 1200° C., the system for processing the exhaust gas of an alternative prior art may comprise multiple staged air dilutions (not shown), and multiple staged air dilutions may be used with respective multiple staged mixing devices for diluting and mixing with the organic exhaust gas evenly, for example, providing three or four staged air dilutions and the corresponding three or four staged mixing devices, as a result, the RTO of the prior art may have a large volume and the manufacture and processing cost becomes higher.

Various embodiments of a system and method for processing an exhaust gas are provided herein to solve the problems as described above. The embodiments herein can effectively decrease exhaust gas processing cost, and can improve the energy efficiency and can decrease the volume and the cost of the RTO, comparing with a system and method without one or more feature disclosed herein.

Figure 2:
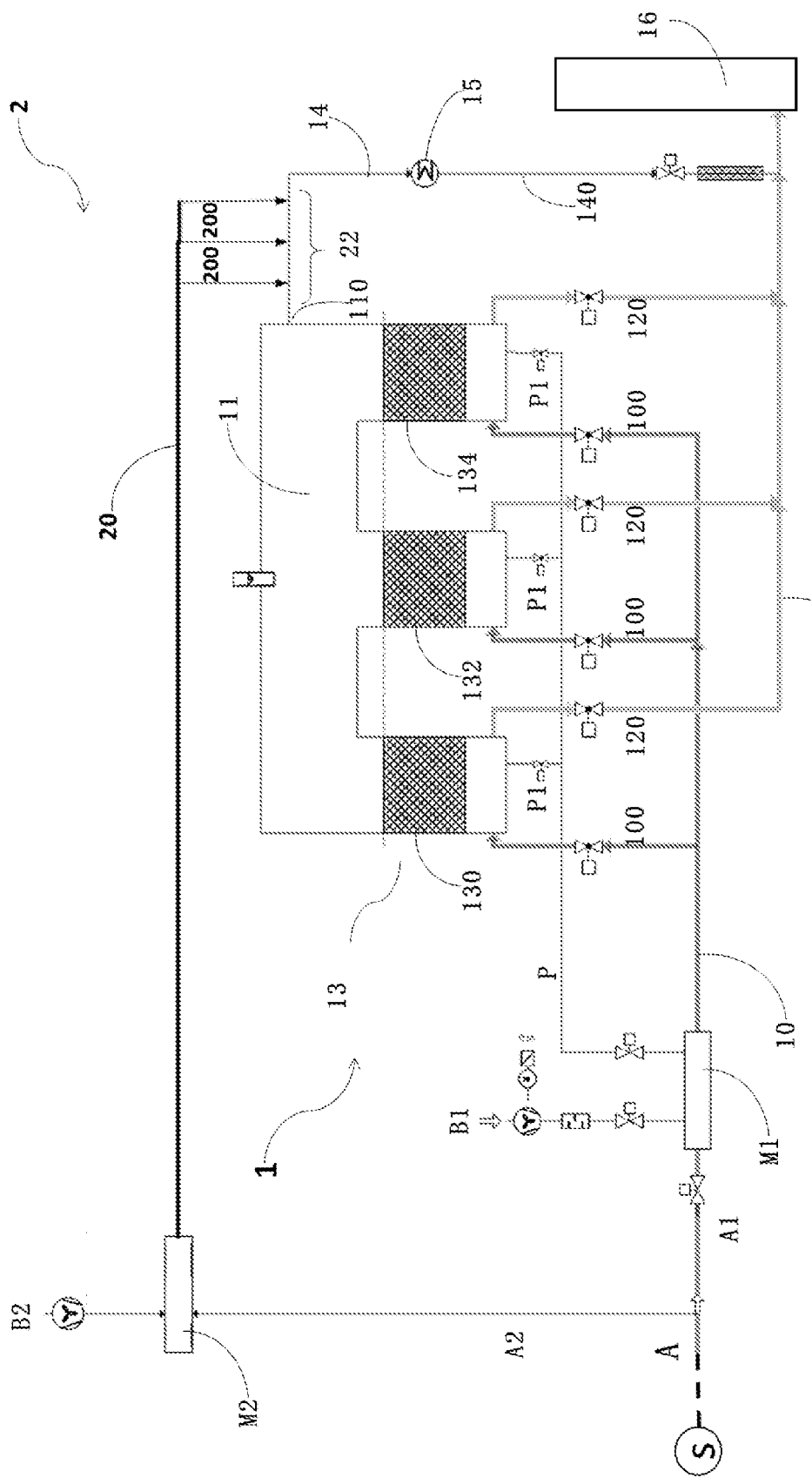
FIG. 2 is a schematic diagram of a system for processing an exhaust gas in accordance with an embodiment of the disclosure herein.

FIG. 2 shows an exemplary embodiment of a system for processing an exhaust gas disclosed herein. As illustrated in FIG. 2, the system for processing the exhaust gas (referred to as "the processing system" below) 2 comprises a regenerative thermal oxidizer(RTO) or RTO furnace 1, a bypass flow module 20, a mixing module 22 and a related control module (not shown). The RTO 1 is configured to receive and process a first part of the organic exhaust gas A1 for oxidizing and decomposing an organic compound therein, thus a hot tail gas is produced in the RTO 1 and a predetermined amount of the hot tail gas may be delivered outside of the RTO 1. The bypass flow module 20 is in parallel with the RTO 1 and configured to receive and bypass a second part of the organic exhaust gas A2 around the RTO 1 into the mixing module 22, where the second part of the organic exhaust gas A2 mixes with a predetermined amount of the hot tail gas from the RTO 1; the predetermined amount of the hot tail gas has sufficient heat or heat energy for oxidizing and decomposing an organic compound, such as VOC etc., of the second part of the organic exhaust gas A2, such that a dischargeable tail gas is produced together for discharging out of the mixing module 22 and into an atmosphere or an ambient environment through a downstream exhaust conduit 140. Various components of the processing system 2 will be descried in detail below referred to FIG. 2.

Similar to the RTO 1 in FIG. 1, the RTO 1 illustrated in FIG. 2 generally comprises an inlet manifold 10, an oxidizing chamber or a combustion chamber 11, an outlet manifold 12, a plurality of regenerative heat-recovery chambers 13, an direct exhaust conduit 14, a heat recovery module or boiler 15, a chimney 16, a plurality of related control valves and a corresponding RTO control unit (not show, the RTO control unit may be a functional module of the control module, or a commercial RTO controller in the market). The first part of the organic exhaust gas A1 is directed into the oxidizing chamber 11 through the inlet manifold 10 for oxidizing, and an outlet manifold 12 is utilized to discharge the dischargeable tail gas out of the RTO 1 after cooled by one of the heat-recovery chambers 13.

Each of the heat-recovery chambers 13 comprises one or more heat storage/sink modules fluidly connected to the inlet manifold 10 and the outlet manifold 12, and the storage/sink modules may store an recovery heat energy in a last cycle and then heat the first part of the organic exhaust gas flowing therethrough in a current cycle, thus the first part of the organic exhaust gas A1 may be heated by the previous recovery heat energy to a temperature appropriate to oxidize and decompose the organic compound (such as VOC, etc.) in the oxidizing chamber 11 downstream of the storage/sink modules, such as the temperature ranging from about 800° C. to about 1000° C. The storage/sink modules cooled in the current cycle will be heated in a next cycle by the hot tail gas flowing through. In this embodiment and alternative embodiments, each of the storage/sink modules may comprise at least one ceramic heat storage device or bed, and the corresponding ceramic structure may be either a monolithic structure such as honeycomb or a random structure such as saddles or raschig rings. For example, a corresponding ceramic material is aluminum oxide or cordierite and so on.

The embodiment of the RTO 1 illustrated in FIG. 2 comprises three regenerative heat-recovery chambers 130, 132, 134. In this embodiment and alternative embodiments, the plurality of regenerative heat-recovery chambers may comprise two to five or more regenerative heat-recovery chambers, and the specific number of heat-recovery chambers can be designed or adjusted or varied based on the amount of the organic exhaust gas to be processed and the types and concentration of the organic compounds.

As illustrated in FIG. 2, the total amount of the organic exhaust gas A is supplied by an organic exhaust gas source S, the organic exhaust gas source S may be related manufacture companies, and the organic exhaust gas may be an industrial tail gas from related manufacture companies. The total amount of the organic exhaust gas A or the respective first part of or the second part of the organic exhaust gas A1 or A2 comprises a combustible gas with a calorific value ranging from about 100 kJ/Nm3 to about 1000 kJ/Nm3, more specifically, comprises a combustible gas with a calorific value of about 100 kJ/Nm3, about 500 kJ/Nm3 or about 1000 kJ/Nm3, etc., wherein the combustible gas may comprise VOC and so on. The total amount of the organic exhaust gas A may be an organic exhaust gas containing VOC with even and substantially constant calorific value during a short period, but its calorific value may be fluctuated with technics variation in a longer term. The total amount of the organic exhaust gas A is split into the first part and the second part of the organic exhaust gas A1 and A2 at the upstream of the inlet manifold 10.

A proportion of the first part of the organic exhaust gas A1 in the total amount of the organic exhaust gas A is in a range of about 10% to 90%, by volume or by weight; and a proportion of the second part of the organic exhaust gas A2 in the total amount of the organic exhaust gas A is respectively in a range of about 90% to 10%, by volume or by weight. That is, the total amount of the organic exhaust gas A comprises about 10% to 90%, by volume or by weight, of the first part of the organic exhaust gas A1 and respective about 90% to 10%, by volume or by weight, of the second part of the organic exhaust gas A2. The flow rate of the first part and the second part of the organic exhaust gas A1 and A2 or their ratio (A1/A2) may be adjusted through corresponding valves. In alternative embodiments, the total amount of the organic exhaust gas A may comprise about 10% to 40%, more particularly about 15% to 25%, by volume or by weight, of the first part of the organic exhaust gas A1 and respective about 90% to 60%, more particularly about 85% to 75%, by volume or by weight, of the second part of the organic exhaust gas A2. It can be understood that, the higher VOC concentration of the total amount of the organic exhaust gas A is, the bigger the relative or absolute flow rate or ratio of the first part of the organic exhaust gas A1 is.

Still referring to FIG. 2, the first part of the organic exhaust gas A1 may be diluted by a first part of a diluting air B1 supplied by a first diluting air supply outside of the RTO 1, and the first diluting air supply may be a fan and the like which draws air from the ambient environment. A first mixer M1 may be disposed in the inlet manifold 10 and downstream of the organic exhaust gas source S and utilized for mixing the first part of the organic exhaust gas A1 and the first part of the diluting air B1 before they enter the RTO 1. The first mixer M1 may be a rotatable mixer or a static mixer and so on.

As illustrated in FIG. 2, The inlet manifold 10 may be fluidly connected to the downstream of the first mixer M1 and utilized for receiving the diluted first part of the organic exhaust gas A1 mixed by the first mixer M1. A purge manifold P for receiving or collecting a purge (or purged) gas from the RTO 1 may be fluidly connected to the inlet manifold 10 (shown in FIGS. 3 and 4) or the first mixer M1. Each heat-recovery chamber 13 may be fluidly connected to the inlet manifold 10 via an inlet branch pipe 100 for receiving the diluted first part of the organic exhaust gas A1 therefrom. Each heat-recovery chamber 13 may be fluidly connected to the out manifold 12 via an outlet branch pipe 120 for discharging the cooled dischargeable tail gas into the out manifold 12. Each heat-recovery chamber 13 may be fluidly connected to the purge manifold P via a purge branch pipe P1 for delivering the purge gas from the RTO 1 to the inlet manifold 10 when purging is needed. The inlet manifold 10, the outlet manifold 12, and the purge manifold P and the related branch pipes have corresponding control valves operable to open and/or close according to a control signal that is produced by the control module or RTO control unit based on corresponding process, which may be directly set up, modified or adjusted on the commercial control module or RTO control unit and the like.

As illustrated in FIG. 2, the oxidizing chamber 11 may be used for oxidizing and decomposing an organic compound of the first part of the organic exhaust gas A1, thus the hot tail gas is produced in the oxidizing chamber 11. The temperature in the oxidizing chamber 11 is controlled or maintained in a range of about 800° C. to about 1000° C. for ensuring completely oxidizing and decomposing the organic compound (such as VOC, etc.) therein, and simultaneously avoiding producing toxic matters. A support burner 17(shown in FIG. 3 and FIG. 4) may selectively provide an additional hot gas when the oxidizing chamber 11 is at an over low temperature. The oxidizing chamber 11 is provided with a direct exhaust outlet 110 and used for discharging or directly discharging a predetermined amount of the hot tail gas through the direct exhaust conduit 14 fluidly connected to the direct exhaust outlet 110 outside of the oxidizing chamber 11.

It should be understood that the hot tail gas discharged out of the oxidizing chamber 11 through the direct exhaust conduit 14(i.e. the predetermined amount of the hot tail gas) accounts for not more than 25% (by volume or by weight) of the total hot tail gas simultaneously produced therein, which ensures the RTO to run steadily. With the development of the technology, the amount of the hot tail gas discharged out of the oxidizing chamber 11 through the direct exhaust conduit 14 may be increased.

Optionally, the processing system 2 further comprises a second mixer M2 and a second diluting air supply disposed outside of the RTO 1, the second mixer M2 may be disposed in a bypass flow module 20, such as a bypass conduit, and the second diluting air supply may be used for providing a second part of a diluting air B2 for diluting the second part of the organic exhaust gas A2, and the second mixer M2 is used for receiving and mixing the second part of the organic exhaust gas A2 and the second part of the diluting air B2 before they enter the mixing module 22. The amount or the flow rate of the second part of the diluting air B2 may be controllable and adjustable, which may be determined to ensure providing sufficient oxygen to the second part of the organic exhaust gas A2 for completely oxidizing and decomposing an organic compound thereof in the mixing module 22. Similarly, the second diluting air supply may be a fan and the like which draws air from the ambient environment or atmosphere, and the second mixer M2 may be a rotatable mixer or a static mixer and so on.

As illustrated in FIG. 2, the bypass flow module 20 is configured to be in parallel with the RTO and for receiving the second part of the organic exhaust gas A2 split from the total amount of the organic exhaust gas A. Flow rate adjustment device(s) or valve(s) or the second mixer M2 described above may be correspondingly disposed in the bypass flow module 20, and the control module may be utilized to control the flow rate or opening or closing corresponding valves based on input(s) from one or more users via human machine interface(HMI). The bypass flow module 20 bypasses the second part of the organic exhaust gas A2 around the RTO 1 into the mixing module 22. More specifically, three staged flow paths or other numbers of paths 200 are as illustrated in FIG. 2 and utilized to deliver diluted or undiluted second part of the organic exhaust gas A2 into the mixing module 22.

The mixing module 22 is disposed downstream of the RTO 1 for receiving the predetermined amount of the hot tail gas from or directly from the oxidizing chamber 11 and the diluted or undiluted second part of the organic exhaust gas A2 from the bypass flow module 20. In this embodiment and alternative embodiments, a flow ratio of the predetermined amount of the hot tail gas entering the mixing module 22 via the direct exhaust conduit 14 to the second part of the organic exhaust gas A2 entering the mixing module 22 ranges from about 1:1 to about 15:1, and the flow ratio may be calculated and determined based on VOC concentration or content of the organic exhaust gas and the process capacitance of the RTO and operational characteristics, and just ensures that the dischargeable tail gas from the mixing module 22 into a downstream exhaust conduit 140 coincides with state or local emission standards or regulations, especially VOC related omission standards.

The second part of the organic exhaust gas A2 absorbs sufficient heat from the predetermined amount of the hot tail gas directly from the oxidizing chamber 11 in the mixing module 22 for oxidizing and decomposing an organic compound therein, such that a dischargeable tail gas is produced at an outlet (not shown) of the mixing module 22. The temperature of the mixing module 22 is maintained in a range of about 600° C. to about 1200° C. during oxidizing and decomposing the organic compound of the second part of the organic exhaust gas A2. A passing time of the second part of the organic exhaust gas A2 passing through (i.e. from entering to leaving) the mixing module 22 ranges from about 0.5 second to about 2 seconds. In this embodiment and alternative embodiments, the mixing module 22 is maintained at a temperature ranging from about 700° C. to about 1100° C. during oxidizing and decomposing the organic compound (such as VOC, etc.), more specially, at about 850° C., and a passing time of the second part of the organic exhaust gas A2 passing through the mixing module 22 is about one second.

The mixing module 22 may be a mixing tube or a mixing chamber. In this embodiment, the mixing module 22 is a mixing tube 22, the corresponding mixing tube is the same material as the direct exhaust conduit 14 or the downstream exhaust conduit 140. The mixing tube 22 may comprise protrusions, recesses, or its combination or a venture configuration for enhancing mixing, and the mixing tube 22 may have different an insider diameter, an outside diameter, and a cross section shape from that of the direct exhaust conduit 14.

In the illustrated embodiment, the processing system 2 further comprises a heat recovery module or boiler 15 disposed downstream of the mixing module 22, and the heat recovery module 15 is used for receiving the dischargeable tail gas from the mixing module 22 and recovering the heat therefrom for producing a heated fluid, such as steam and so on. The dischargeable tail gas flows into a chimney 16 at the end of the downstream exhaust conduit 140, and combines with the dischargeable tail gas cooled by the heat-recovery chamber 13 in the chimney 16, and may conduct other process such as smoke and smog removing and the like before discharging to the atmosphere or ambient environment.

Figure 3:
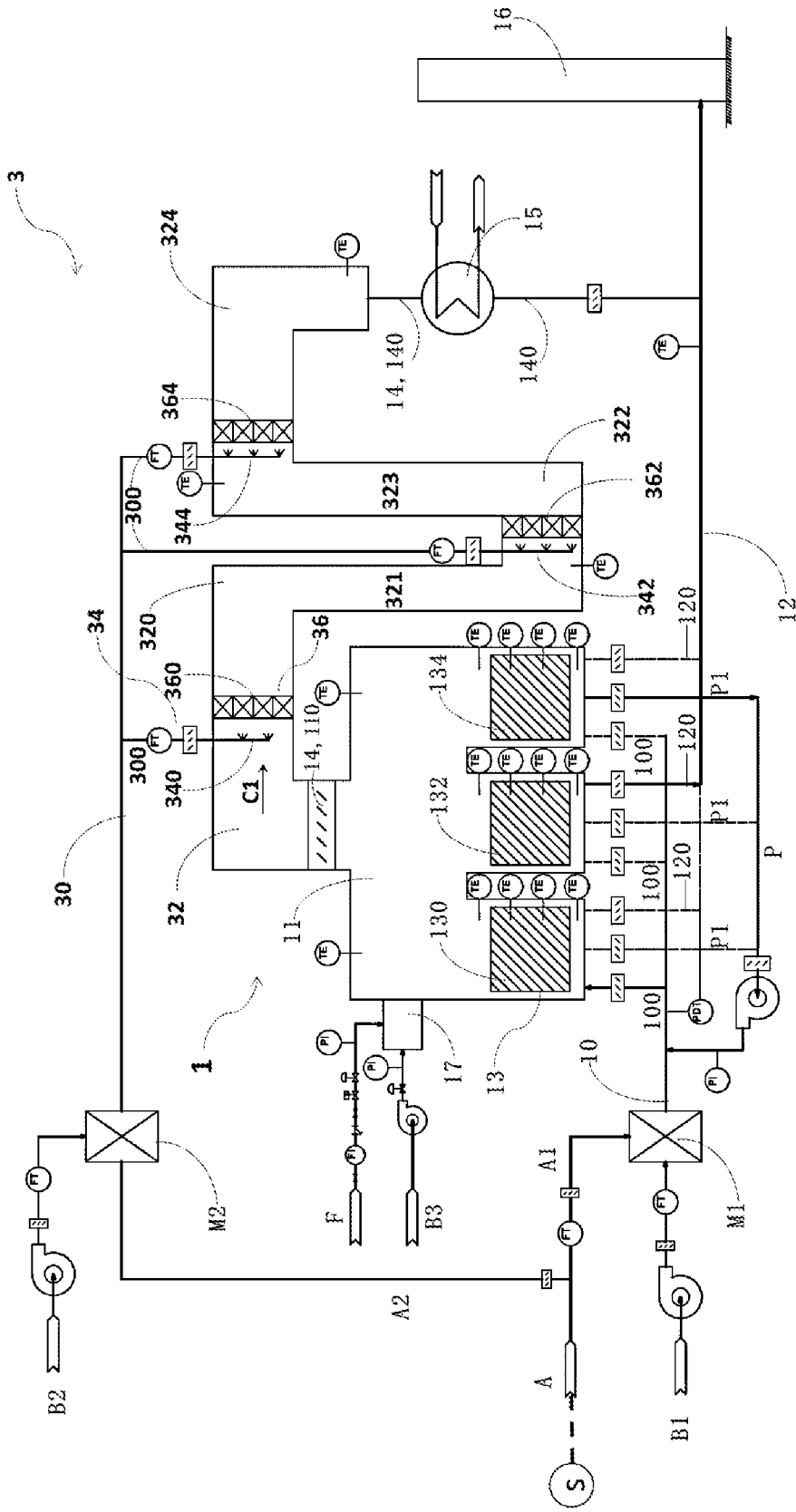
FIG. 3 is a schematic diagram of a system for processing an exhaust gas in accordance with an embodiment of the disclosure herein.

FIG. 3 illustrates an exemplary alternative embodiment of a system for processing an exhaust gas disclosed herein. As shown in FIG. 3, the processing system 3 comprises the RTO 1 or RTO furnace 1, a bypass flow module 30, a mixing module 32, a plurality of related control valves and a corresponding control module (not shown), and the RTO 1 is basically the same as illustrated in FIG. 1 and FIG. 2. For simplifying the description, redundant descriptions won't be made for the configuration and its working process of the RTO 1, and the RTO 1 may be understood referring to the above description. Different from the mixing module 22 configured to be the mixing tube, the mixing module 32 in FIG. 3 is configured to be a mixing chamber 32 having more complex structures and shapes, and the mixing chamber 32 comprises a plurality of mixing segments and at least one reaction segment. As illustrated in FIG. 3, the mixing chamber 32 comprises three mixing segments 320, 322, 324, and two reaction segments 321 and 323, wherein the reaction segment 321 is fluidly connected between the mixing segments 320 and 322, and the reaction segments 323 is fluidly connected between the mixing segments 322 and 324. A plurality of injectors 34 are disposed in the mixing chamber 32 and fluidly connected to a plurality of staged flow paths 300 of the bypass flow module 30, for example, as shown in FIG. 3, three injectors 340, 342, 344 are connected to the respective three staged flow path 300, and are separately disposed in the respective mixing segments 320, 322, 324 along a flow direction in the mixing module 32, and are used for injecting the second part of the organic exhaust gas A2 at respective axial positions of the mixing module 32.

As shown in FIG. 3, a plurality of mixer assemblies 36, such as three mixer assemblies 360, 362, 364, may be transversely disposed across the mixing module 32 perpendicular to a flow direction Cl therein. The mixer assemblies 360, 362, 364 are each disposed downstream of the respective injectors 340, 342, 344 for enhancing mixing the second part of the organic exhaust gas A2 and the predetermined amount of the hot tail gas. For example, the three mixer assemblies 360, 362, 364 are disposed downstream of the three injectors 340, 342, 344, respectively.

Similar to the mixing module 22 in FIG. 2, the mixing module or chamber 32 is maintained at a temperature ranging from about 600° C. to about 1200° C. during oxidizing and decomposing the organic compound of the second part of the organic exhaust gas A2, and a passing time of the second part of the organic exhaust gas passing through the mixing module 32 ranges from about 0.5 second to about 2 seconds. In this embodiment and alternative embodiments, the mixing module 32 is maintained at a temperature ranging from about 700° C. to about 1100° C. during oxidizing and decomposing the organic compound, more specially, the temperature of the reaction segments 321 and 323 is maintained no lower than about 800° C., such as at about 850° C., and a passing time of the second part of the organic exhaust gas A2 passing through the mixing module 32 is about one second.

Figure 4:
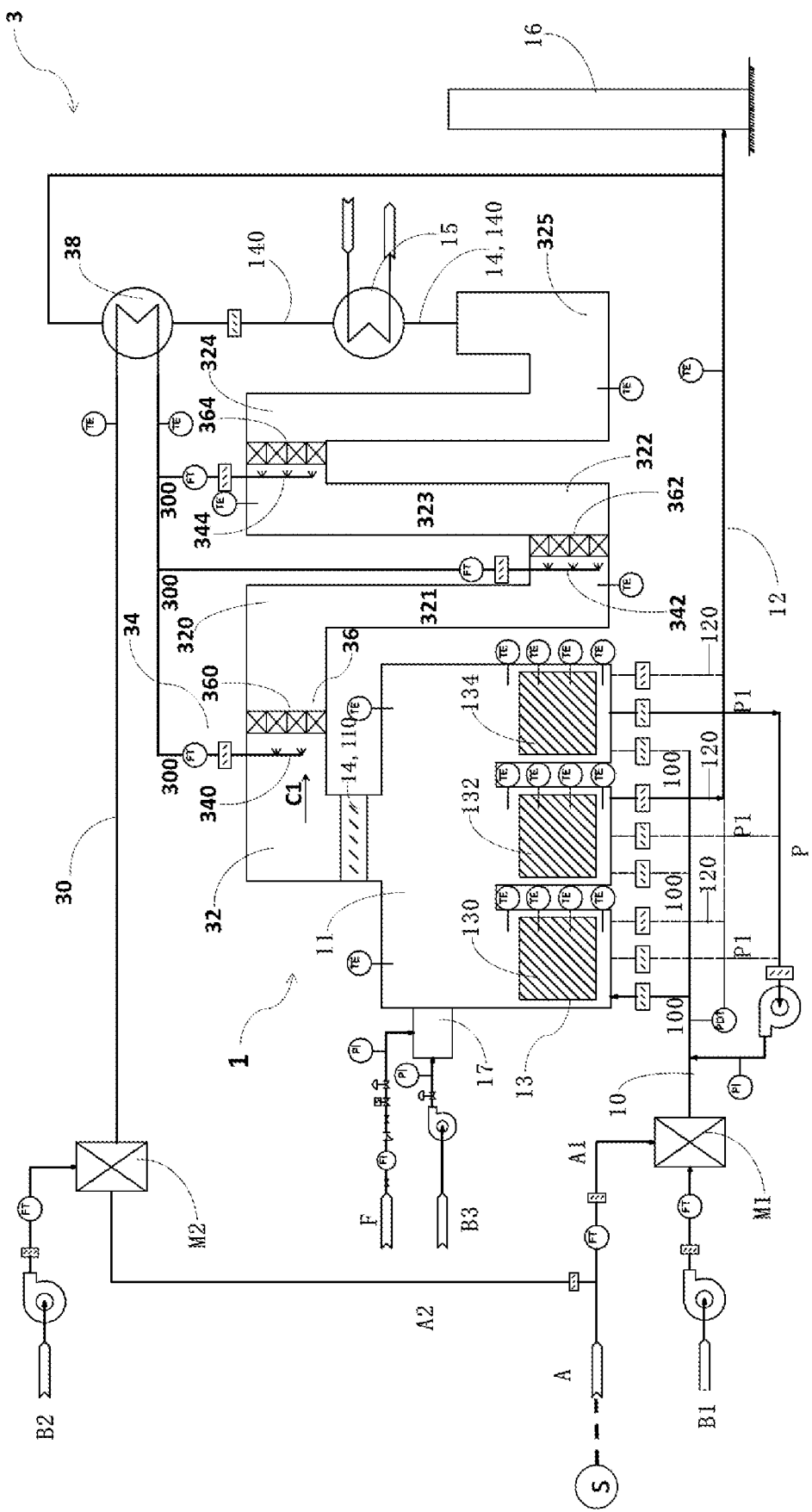
FIG. 4 is a schematic diagram of a system for processing an exhaust gas in accordance with an embodiment of the disclosure herein.

FIG. 4 illustrates another exemplary alternative embodiment of a system for processing an exhaust gas disclosed herein. Most components of the processing system embodiment shown in FIG. 4 are the same as or similar to corresponding components of the embodiment in FIG. 3. For simplifying the description, redundant descriptions won't be made for the basically same or similar components in both embodiments, the embodiment in FIG. 4 may be understood by referring to the above description and the embodiment in FIG. 3.

The substantial difference between the embodiment in FIG. 4 and the embodiment in FIG. 3 lies in, the processing system 3 in FIG. 4 further comprises a gas-flow heater 38 disposed in the bypass flow module 30, and the gas-flow heater 38 may comprise a preheating path (not shown) fluidly connected to the bypass flow module 30 and a heat-absorbing path (not shown) fluidly connected to the downstream exhaust conduit 140, and the preheating path is used for receiving and preheating the second part of the organic exhaust gas A2 flowing toward the mixing module 32. The gas-flow heater 38 may comprise a gas-gas heater or a gas-steam heater and so on, the heat-absorbing path of the gas-flow heater 38 may receive and absorb heat from the dischargeable tail gas directly from the mixing module 32, or the dischargeable tail gas directly from and cooled by the heat recovery module 15, or the heated fluid such as steam and so on directly from the heat recovery module 15. The energy efficiency may be improved through the gas-flow heater 38 preheating the second part of the organic exhaust gas A2, and the second part of the organic exhaust gas A2 can absorb additional heat for ensuring completely oxidizing and decomposing an organic compound thereof, such as VOC and the like.

As illustrated in FIG. 4, the heat-absorbing path of the gas-flow heater 38 is disposed in the downstream exhaust conduit 140 and located downstream of the heat recovery module 15. In alternative embodiments, the gas-flow heater 38 may be disposed in the downstream exhaust conduit 140 and located upstream of the heat recovery module 15.

It should be understood that, a support burner 17 outside of the RTO 1 is shown in FIG. 3 and FIG. 4 for selectively providing a complementary or support hot gas. The control module generates a complementary control instruction when the oxidizing chamber is at a lower temperature and needs additional hot gas, and the optional support burner 17 may receive the complementary control instruction and accept a fuel supply F and a support diluting air supply B3 and combust both of them and then produce a hot gas with desired temperature and desired flow rate, thus the resulted hot gas may be supplied into the oxidizing chamber 11 for maintaining the temperature thereof in the range of about 800° C. to about 1000° C.

In order to further explain the configuration, theory and effects of the processing system 2 or 3 disclosed herein, the processing the exhaust gas will be exemplarily described in details by referring to FIGS. 2-4 as below, but are not limited to these descriptions; when processing the organic exhaust gas, firstly, about 10% to 90%, or about 10% to 40%, or about 15% to 25% (by volume or by weight) of the total amount of the organic exhaust gas A is split as the first part of the organic exhaust gas A1, the left part is split as the second part of the organic exhaust gas A2; then the first part of the organic exhaust gas A1 and the second part of the organic exhaust gas A2 are respectively directed toward the RTO 1 and the bypass flow module 22 or 32; the first part of the organic exhaust gas A1 may mix with the first part of the diluting air B1 supplied by the first diluting air supply in the first mixer M1 and then the diluted first part of the organic exhaust gas A1 is produced and flows through one of the heat-recovery chambers 13 via the inlet manifold 10 and absorbs heat recovered in the last cycle; the flow rate of the first part of the organic exhaust gas A1 is controlled by the control module for passing through the oxidizing chamber 11 in a time period of about 0.5 second to 1 second; the first part of the organic exhaust gas A1 may be introduced sooner than the second part of the organic exhaust gas A2 at the beginning, preferably when the first part of the organic exhaust gas A1 has been oxidized and the predetermined amount of the hot tail gas is delivering through the direct exhaust conduit 14 into the mixing module 22 or 32, the second part of the organic exhaust gas A2 just flows into the mixing module 22 or 32 and mixes with the predetermined amount of the hot tail gas; the second part of the organic exhaust gas A2 may be diluted by the second part of the diluting air B2 and the second mixer M2 or may not be diluted, and the second part of the organic exhaust gas A2 spends about one second on mixing with the predetermined amount of the hot tail gas in a flow ratio ranging from about 1:1 to about and absorbing heat therefrom and oxidizing and decomposing the organic compound therein, such as VOC and so on; thus the dischargeable tail gas at a temperature up to about 600° C. is produced at an outlet of the mixing module 22 or 32 and delivered to the downstream exhaust conduit 140; the dischargeable tail gas may only flow through the heat recovery module 15 for recovering heat therefrom, or the dischargeable tail gas may firstly flow through the heat recovery module 15 then subsequently flow through the gas-flow heater 38, and vice versa; the second part of the organic exhaust gas A2 may be preheated when flows through the bypass flow module 30 and the gas-flow heater 38; the dischargeable tail gas flows into a chimney 16 at the end of the downstream exhaust conduit 140 after heat recovering, and combines with the dischargeable tail gas from the outlet manifold 12 and cooled by the heat-recovery chamber 13 in the chimney 16, at last leaves the chimney 16 and discharges to the ambient environment.

Figure 5:
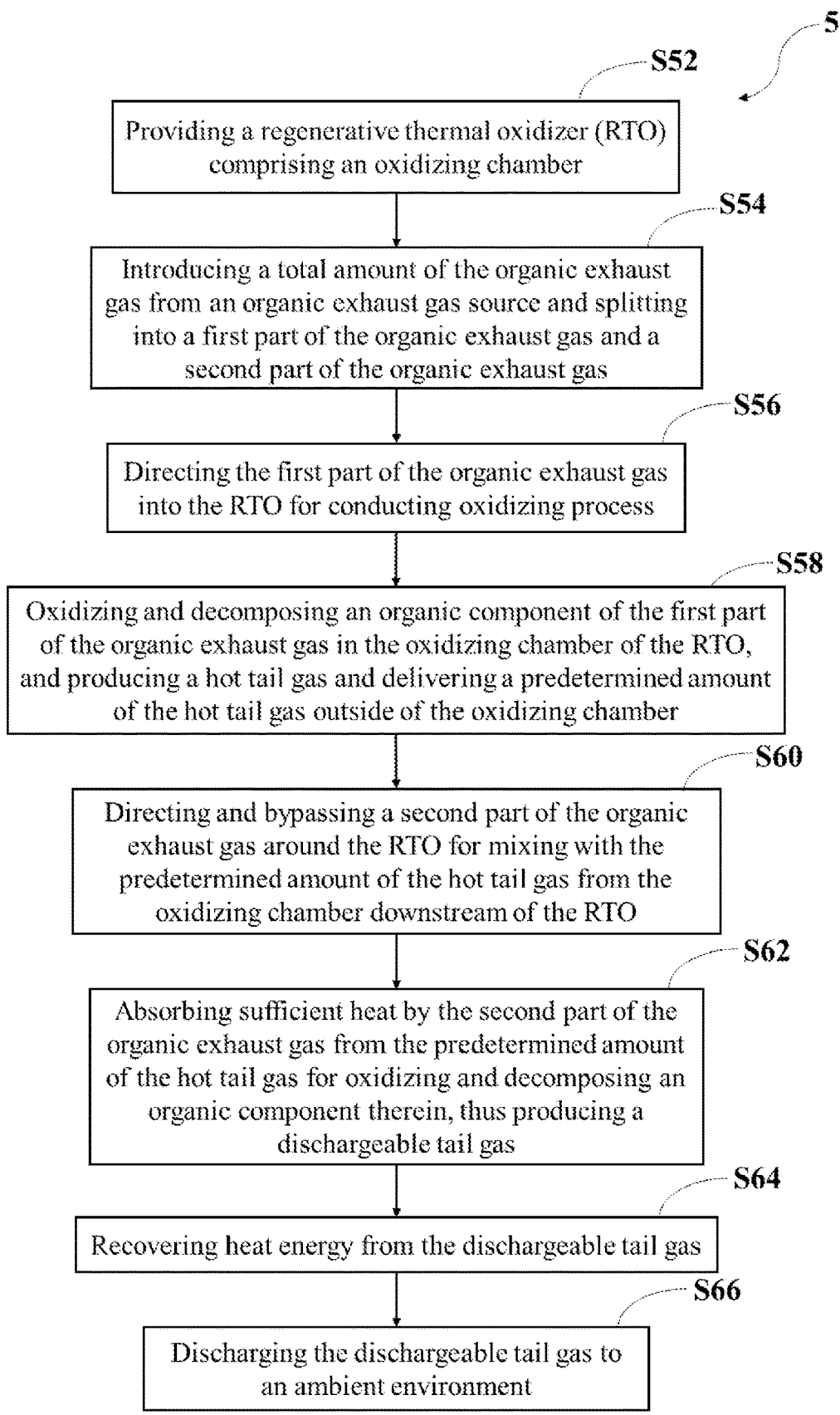
FIG. 5 is a flowchart illustrating a method for processing an exhaust gas in accordance with an embodiment of the disclosure herein.

Referring now to FIG. 5, and also referring to FIG. 2 to FIG. 4 together, FIG. 5 illustrates an exemplary embodiment flowchart of a method 50 for processing an exhaust gas disclosed herein, the method 50 may be conducted by the processing system 2 or 3 as shown in FIGS. 2-4 and other similar system. As shown in FIG. 5, the method 50 begins at step S52 by providing a regenerative thermal oxidizer (RTO) comprising an oxidizing chamber. The specific structure of RTO in step S52 may be understood by referring to the RTO 1 described above and shown in FIG. 2 to FIG. 4 which comprises the inlet manifold the outlet manifold 12, the oxidizing chamber or the combustion chamber 11, the regenerative heat-recovery chambers 13 and the direct exhaust conduit 14 and other components.

The method 50 further comprises introducing a total amount of the organic exhaust gas from an organic exhaust gas source and splitting into a first part of the organic exhaust gas and a second part of the organic exhaust gas at step S54, wherein the first part and the second part of the organic exhaust gas will be introduced into the RTO and bypassed around the RTO in subsequent steps, respectively; and wherein the total amount of the organic exhaust gas comprises about 10% to 90%, by volume or by weight, of the first part of the organic exhaust gas and respective about 90% to 10%, by volume or by weight, of the second part of the organic exhaust gas. In this embodiment and alternative embodiments, the total amount of the organic exhaust gas may comprise about 10% to 40%, more particularly about 15% to 25%, by volume or by weight, of the first part of the organic exhaust gas and respective about 90% to 60%, more particularly about 85% to 75%, by volume or by weight, of the second part of the organic exhaust gas. It should be understood that, the percentage content of the first part and the second part of the organic exhaust gas may be adjusted relative to its calorific value or VOC concentration or the characteristics of the RTO and so on.

The method 50 further comprises directing the first part of the organic exhaust gas into the RTO for conducting oxidizing process at step S56. In step S56, the first part of the organic exhaust gas is directed or introduced into the RTO via the inlet manifold 10 shown in FIG. 2 to FIG. 4, and heated by one of the heat-recovery chambers 13 with a heat energy or heat recovered in the last cycle, and then enters the oxidizing chamber 11 for conducting oxidizing.

It should be noticed that, before conducting step S56, the method 50 may comprises a diluting step by using the first part of the diluting air B1 and the first mixer M1 shown in FIG. 2 to FIG. 4 to dilute the first part of the organic exhaust gas A1, such that the first part of the organic exhaust gas A1 may obtain sufficient oxygen for oxidizing and decomposing an organic compound therein in step S56. If the first part of the organic exhaust gas has enough oxygen, diluting may not be conducted.

Still referring to FIG. 5, the method 50 further comprises oxidizing and decomposing an organic component of the first part of the organic exhaust gas in the oxidizing chamber of the RTO, and producing a hot tail gas and delivering a predetermined amount of the hot tail gas outside of the oxidizing chamber at step S58. In S58, the predetermined amount of the hot tail gas is delivered outside of the oxidizing chamber 11 through the direct conduit 14 fluidly connected to the direct outlet 110 of the oxidizing chamber 11 as illustrated in FIG. 2 to FIG. 4.

The method 50 further comprises directing and bypassing a second part of the organic exhaust gas around the RTO for mixing with the predetermined amount of the hot tail gas from the oxidizing chamber downstream of the RTO at step S60. In step S60, the predetermined amount of the hot tail gas mixes with the second part of the organic exhaust gas in the downstream of the RTO in a flow ratio of about 1:1 to about 15:1, specifically both of them mix with each other in the mixing module 22 or 32 as illustrated in FIG. 2 to FIG. 4.

It should be noticed that, before step S60, the method 50 may further comprise providing the mixing module 22 such as a mixing tube as shown in FIG. 2 for mixing the second part of the organic exhaust gas with the predetermined amount of the hot tail gas; before step S60, the method 50 may further comprise providing the mixing chamber 32 as shown in FIG. 3 and FIG. 4 which comprises the plurality of mixing segments 320, 322, 324, and further providing the plurality of injectors 34 and the plurality of mixer assemblies 36 separately disposed in the mixing chamber 32 and relatively upstream and downstream along the flow direction therein; such that the second part of the organic exhaust gas is injected in the respective mixing segments through the plurality of injectors 34, and the mixing between the second part of the organic exhaust gas A2 and the predetermined amount of the hot tail gas may be enhanced by the downstream mixer assemblies 36, thus the mixing module or chamber 32 may be maintained at a temperature ranging from about 600° C. to about 1200° C.

Optionally, before step S60, the method 50 may further comprise a diluting step by using the second part of the diluting air B2 and the second mixer M2 shown in FIG. 2 to FIG. 4 to dilute the second part of the organic exhaust gas A2, such that the second part of the organic exhaust gas A2 may obtain sufficient oxygen for oxidizing and decomposing organic compound therein. If the second part of the organic exhaust gas A2 has enough oxygen, diluting may not be conducted therefor.

The method 50 further comprises absorbing sufficient heat by the second part of the organic exhaust gas from the predetermined amount of the hot tail gas for oxidizing and decomposing an organic component of the second part of the organic exhaust gas, thus producing a dischargeable tail gas at step S62.

The method 50 further optionally comprises recovering heat energy from the dischargeable tail gas at step S64. In step S64, the gas-flow heater 38 and the heat recovery module 15 shown in FIG. 4 may be disposed in any order in the downstream exhaust conduit 140 through which the dischargeable tail gas flows, thus the heat or heat energy may be recovered from the dischargeable tail gas and reused for preheating the second part of the organic exhaust gas or producing the heated fluid.

After the step S64, the method 50 further comprises discharging the dischargeable tail gas to an ambient environment at step S66.

Various embodiments disclosed herein don't deliver the total amount of the organic exhaust gas to RTO for processing, instead bypass a part of the organic exhaust gas around the RTO to its downstream, and then mix with the predetermined amount of the hot tail gas from the oxidizing chamber in the downstream of RTO, thus the organic compound of the organic exhaust gas bypassed around the RTO may be oxidized and decomposed by using the heat energy from the hot tail gas directly from the oxidizing chamber. The embodiments disclosed herein may decrease the cost for processing the exhaust gas efficiently, improve energy efficiency, decrease the volume the cost of the RTO, and alleviates the burden of the RTO.

In one embodiment, a system for processing an exhaust gas comprises: a regenerative thermal oxidizer (RTO) configured to oxidize a first part of the exhaust gas and produce a hot tail gas and deliver a predetermined amount of the hot tail gas outside of the RTO; a mixing module disposed downstream of the RTO and configured to receive the predetermined amount of the hot tail gas from the RTO; and a bypass flow module in parallel with the RTO and configured to receive and bypass a second part of the exhaust gas around the RTO into the mixing module; wherein the second part of the exhaust gas absorbs sufficient heat from the predetermined amount of the hot tail gas in the mixing module for oxidizing and decomposing an organic compound therein.

In one example, the system further comprises an exhaust gas source for supplying a total amount of the exhaust gas consisting of the first part and the second part of the exhaust gas, wherein a proportion of the first part of the exhaust gas in the total amount of the exhaust gas is in a range of about 10% to 90%, by volume or by weight, and a proportion of the second part of the exhaust gas in the total amount of the exhaust gas is respectively in a range of about 90% to 10%, by volume or by weight.

In one example, the RTO comprises an oxidizing chamber and a direct exhaust conduit fluidly connected to the oxidizing chamber, and wherein the oxidizing chamber is used for producing the hot tail gas by oxidizing and decomposing an organic compound of the first part of the exhaust gas and delivering the predetermined amount of the hot tail gas to the mixing module through the direct exhaust conduit.

In one example, a flow ratio of the predetermined amount of the hot tail gas to the second part of the exhaust gas in the mixing module ranges from about 1:1 to about 15:1.

In one example, at least one of the first part or the second part of the exhaust gas comprises a combustible gas containing a volatile organic compound with a calorific value ranging from about 100 kJ/Nm3 to about 1000 kJ/Nm3.

In one example, at least one of the first part or the second part of the exhaust gas comprises the combustible gas with a calorific value of about 100 kJ/Nm3, or about 500 kJ/Nm3 or about 1000 kJ/Nm3.

In one example, the system further comprises at least one mixer and at least one diluting air supply outside of the RTO, wherein the at least one diluting air supply is used for supplying a diluting air to the first part and/or the second part of the exhaust gas, and wherein the at least one mixer is used for mixing the first part and/or the second part of the exhaust gas and the diluting air before they enter the RTO and/or the mixing module.

In one example, the system further comprises a plurality of injectors, wherein the mixing module comprises a plurality of mixing segments, and wherein the plurality of injectors are separately disposed in the respective mixing segments of the mixing module along a flow direction thereof, wherein the plurality of injectors are used for injecting the second part of the exhaust gas at respective axial positions of the mixing module.

In one example, the system further comprises a plurality of mixer assemblies transversely disposed across the mixing module perpendicular to a flow direction thereof, wherein each mixer assembly is disposed downstream of the respective injector for enhancing mixing the second part of the exhaust gas and the predetermined amount of the hot tail gas.

In one example, the temperature of the mixing module is maintained in a range of 600° C. to 1200° C. during oxidizing and decomposing the organic compound of the second part of the exhaust gas, and a passing time of the second part of the exhaust gas passing through the mixing module ranges from 0.5 second to 2 seconds, such that a dischargeable tail gas is produced at an outlet of the mixing module.

In one example, the system further comprises a heat recovery module disposed downstream of the mixing module, wherein the heat recovery module is used for receiving the dischargeable tail gas from the mixing module and recovering the heat therefrom for producing a heated fluid.

In one example, the system further comprises a gas-flow heater disposed in the bypass flow module, wherein the gas-flow heater is configured to receive and absorb heat from one of the dischargeable tail gas from the mixing module, or the dischargeable tail gas from the heat recovery module, or the heated fluid from the heat recovery module for preheating the second part of the exhaust gas.

In one example, the mixing module is configured to be a mixing tube or a mixing chamber.

In another embodiment, a method for processing an exhaust gas comprises: providing a regenerative thermal oxidizer (RTO); directing a first part of the exhaust gas into the RTO for oxidizing and producing a hot tail gas and delivering a predetermined amount of the hot tail gas outside of the RTO; and directing and bypassing a second part of the exhaust gas around the RTO for mixing with the predetermined amount of the hot tail gas downstream of the RTO, such that the second part of the exhaust gas absorbs sufficient heat from the predetermined amount of the hot tail gas for oxidizing and decomposing an organic compound therein.

In one example, the method further comprises introducing a total amount of the exhaust gas from an exhaust gas source and splitting into the first part and the second part of the exhaust gas, wherein a proportion of the first part of the exhaust gas in the total amount of the exhaust gas is in a range of about 10% to 90%, by volume or by weight, and a proportion of the second part of the exhaust gas in the total amount of the exhaust gas is respectively in a range of about 90% to 10%, by volume or by weight.

In one example, wherein the RTO comprises an oxidizing chamber and a direct exhaust conduit fluidly connected to the oxidizing chamber, and wherein the oxidizing chamber is used for producing the hot tail gas by oxidizing and decomposing an organic compound of the first part of the exhaust gas and delivering the predetermined amount of the hot tail gas outside of the RTO through the direct exhaust conduit for mixing with the second part of the exhaust gas, and wherein at least one of the first part and the second part of the exhaust gas comprises a combustible gas containing a volatile organic compound.

In one example, the predetermined amount of the hot tail gas from the oxidizing chamber is mixed with the second part of the exhaust gas downstream of the RTO in a flow ratio ranging from about 1:1 to about 15:1.

In one example, the method further comprises: supplying a diluting air to the first part and/or the second part of the exhaust gas outside of the RTO for enabling the first part and/or the second part of the exhaust gas to obtain sufficient oxygen for oxidizing the organic compound therein; and mixing the first part and/or the second part of the exhaust gas and the diluting air before they enter the RTO and/or before they mix with the predetermined amount of the hot tail gas.

In one example, the method further comprises providing a mixing module and a plurality of injectors, wherein the mixing module is used for mixing the second part of the exhaust gas and the predetermined amount of the hot tail gas and comprises a plurality of mixing segments, and wherein the plurality of injectors are separately disposed in the respective mixing segments of the mixing module along a flow direction thereof, wherein the plurality of injectors is used for injecting the second part of the exhaust gas at respective axial positions of the mixing module.

In one example, the method further comprises providing a plurality of mixer assemblies transversely disposed across the mixing module perpendicular to a flow direction thereof, wherein each mixer assembly is disposed downstream of the respective injector for enhancing mixing the second part of the exhaust gas and the predetermined amount of the hot tail gas.

In one example, the temperature of the mixing module is maintained in a range of 600° C. to 1200° C. during oxidizing and decomposing the organic compound of the second part of the exhaust gas, and a passing time of the second part of the exhaust gas passing through the mixing module ranges from 0.5 second to 2 seconds, thus a dischargeable tail gas is produced at an outlet of the mixing module.

In one example, the method further comprises providing a gas-flow heater and/or a heat recovery module for recovering heat from the dischargeable tail gas and preheating the second part of the exhaust gas and/or producing a heated fluid.

This written description uses examples to disclose the concepts discussed herein, including the best mode, and also sufficient disclosure to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for processing an exhaust gas, comprising:
a regenerative thermal oxidizer (RTO) configured to oxidize a first part of the exhaust gas and produce a hot tail gas and deliver a predetermined amount of the hot tail gas outside of the RTO;
a mixing module disposed downstream of the RTO and configured to receive the predetermined amount of the hot tail gas from the RTO, wherein the mixing module comprises a plurality of mixing segments;
a bypass flow module in parallel with the RTO and configured to receive and bypass a second part of the exhaust gas around the RTO into the mixing module; and
a plurality of injectors separately disposed in the respective mixing segments of the mixing module along a flow direction thereof, wherein the plurality of injectors are used for injecting the second part of the exhaust gas at respective axial positions of the mixing module;
wherein the second part of the exhaust gas absorbs sufficient heat from the predetermined amount of the hot tail gas in the mixing module for oxidizing and decomposing an organic compound therein.

2. The system according to claim 1, further comprising an exhaust gas source for supplying a total amount of the exhaust gas consisting of the first part and the second part of the exhaust gas, wherein a proportion of the first part of the exhaust gas in the total amount of the exhaust gas is in a range of about 10% to 90%, by volume or by weight, and a proportion of the second part of the exhaust gas in the total amount of the exhaust gas is respectively in a range of about 90% to 10%, by volume or by weight.

3. The system according to claim 1, wherein the RTO comprises an oxidizing chamber and a direct exhaust conduit fluidly connected to the oxidizing chamber, and wherein the oxidizing chamber is used for producing the hot tail gas by oxidizing and decomposing an organic compound of the first part of the exhaust gas and delivering the predetermined amount of the hot tail gas to the mixing module through the direct exhaust conduit.

4. The system according to claim 1, wherein a flow ratio of the predetermined amount of the hot tail gas to the second part of the exhaust gas in the mixing module ranges from about 1:1 to about 15:1.

5. The system according to claim 1, further comprising at least one mixer and at least one diluting air supply outside of the RTO, wherein the at least one diluting air supply is used for supplying a diluting air to the first part and/or the second part of the exhaust gas, and wherein the at least one mixer is used for mixing the first part and/or the second part of the exhaust gas and the diluting air before they enter the RTO and/or the mixing module.

6. The system according to claim 1, further comprising a plurality of mixer assemblies transversely disposed across the mixing module perpendicular to the flow direction thereof, wherein each mixer assembly is disposed downstream of the respective injector for enhancing mixing the second part of the exhaust gas and the predetermined amount of the hot tail gas.

7. The system according to claim 1, wherein the temperature of the mixing module is maintained in a range of about 600° C. to about 1200° C. during oxidizing and decomposing the organic compound of the second part of the exhaust gas, and a passing time of the second part of the exhaust gas passing through the mixing module ranges from about 0.5 second to about 2 seconds, such that a dischargeable tail gas is produced at an outlet of the mixing module.

8. The system according to claim 7, further comprising a heat recovery module disposed downstream of the mixing module, wherein the heat recovery module is used for receiving the dischargeable tail gas from the mixing module and recovering the heat therefrom for producing a heated fluid.

9. The system according to claim 8, further comprising a gas-flow heater disposed in the bypass flow module, wherein the gas-flow heater is configured to receive and absorb heat from one of the dischargeable tail gas from the mixing module, or the dischargeable tail gas from the heat recovery module, or the heated fluid from the heat recovery module for preheating the second part of the exhaust gas.

10. The system according to claim 1, wherein the mixing module is configured to be a mixing tube or a mixing chamber.

11. A method for processing an exhaust gas in a system having a regenerative thermal oxidizer (RTO), the method comprising:
directing a first part of the exhaust gas into the RTO for oxidizing and producing a hot tail gas, and delivering a predetermined amount of the hot tail gas outside of the RTO;
directing and bypassing a second part of the exhaust gas around the RTO for mixing with the predetermined amount of the hot tail gas from the RTO downstream of the RTO, such that the second part of the exhaust gas absorbs sufficient heat from the predetermined amount of the hot tail gas for oxidizing and decomposing an organic compound therein,
mixing, with a mixing module, the second part of the exhaust gas and the predetermined amount of the hot tail gas, the mixing module comprising a plurality of mixing segments; and
injecting, with a plurality of injectors, the second part of the exhaust gas at respective axial positions of the mixing module, wherein the plurality of injectors are separately disposed in the respective mixing segments of the mixing module along a flow direction thereof.

12. The method according to claim 11, further comprising introducing a total amount of the exhaust gas from an exhaust gas source and splitting into the first part and the second part of the exhaust gas, wherein a proportion of the first part of the exhaust gas in the total amount of the exhaust gas is in a range of about 10% to 90%, by volume or by weight, and a proportion of the second part of the exhaust gas in the total amount of the exhaust gas is respectively in a range of about 90% to 10%, by volume or by weight.

13. The method according to claim 11, further comprising producing the hot tail gas by oxidizing and decomposing an organic compound of the first part of the exhaust gas in an oxidizing chamber of the RTO and delivering the predetermined amount of the hot tail gas outside of the RTO through a direct exhaust conduit fluidly connected to the oxidizing chamber for mixing with the second part of the exhaust gas, and wherein at least one of the first part and the second part of the exhaust gas comprises a combustible gas containing a volatile organic compound.

14. The method according to claim 13, wherein the predetermined amount of the hot tail gas from the oxidizing chamber is mixed with the second part of the exhaust gas downstream of the RTO in a flow ratio ranging from about 1:1 to about 15:1.

15. The method according to claim 11, further comprising:
supplying a diluting air to the first part and/or the second part of the exhaust gas outside of the RTO for enabling the first part and/or the second part of the exhaust gas to obtain sufficient oxygen for oxidizing the organic compound therein; and mixing the first part and/or the second part of the exhaust gas and the diluting air before they enter the RTO and/or before they mix with the predetermined amount of the hot tail gas.

16. The method according to claim 11, further comprising providing a plurality of mixer assemblies transversely disposed across the mixing module perpendicular to a flow direction thereof, wherein each mixer assembly is disposed downstream of the respective injector for enhancing mixing the second part of the exhaust gas and the predetermined amount of the hot tail gas.

17. The method according to claim 11, wherein the temperature of the mixing module is maintained in a range of about 600° C. to about 1200° C. during oxidizing and decomposing the organic compound of the second part of the exhaust gas, and a passing time of the second part of the exhaust gas passing through the mixing module ranges from about 0.5 second to about 2 seconds, whereby a dischargeable tail gas is produced at an outlet of the mixing module.

18. The method according to claim 17, further comprising providing a gas-flow heater and/or a heat recovery module for recovering heat from the dischargeable tail gas and preheating the second part of the exhaust gas and/or producing a heated fluid.

19. A system for processing an exhaust gas, comprising:
a regenerative thermal oxidizer (RTO) configured to oxidize a first part of the exhaust gas and produce a hot tail gas and deliver a predetermined amount of the hot tail gas outside of the RTO;
a mixing module disposed downstream of the RTO and configured to receive the predetermined amount of the hot tail gas from the RTO;
a bypass flow module in parallel with the RTO and configured to receive and bypass a second part of the exhaust gas around the RTO into the mixing module, wherein the temperature of the mixing module is maintained in a range of about 600° C. to about 1200° C. during oxidizing and decomposing an organic compound of the second part of the exhaust gas, and a passing time of the second part of the exhaust gas passing through the mixing module ranges from about 0.5 second to about 2 seconds, such that a dischargeable tail gas is produced at an outlet of the mixing module; and
a heat recovery module disposed downstream of the mixing module, wherein the heat recovery module is used for receiving the dischargeable tail gas from the mixing module and recovering the heat therefrom for producing a heated fluid;
wherein the second part of the exhaust gas absorbs sufficient heat from the predetermined amount of the hot tail gas in the mixing module for oxidizing and decomposing the organic compound therein.

* * * * *